United States Patent [19]

Fahrney

[11] Patent Number: 5,058,520

[45] Date of Patent: Oct. 22, 1991

[54] APPARATUS FOR INFLUENCING THE POSITION OF A BOAT IN WATER

[75] Inventor: Volker A. Fahrney, Wuppertal, Fed. Rep. of Germany

[73] Assignee: elTGrim Hugo Kruger KG, Ennepetal, Fed. Rep. of Germany

[21] Appl. No.: 308,209

[22] Filed: Feb. 8, 1989

[30] Foreign Application Priority Data

Feb. 10, 1988 [DE] Fed. Rep. of Germany ....... 3803942

[51] Int. Cl.$^5$ ........................................... H01H 29/22
[52] U.S. Cl. .................................. 114/285; 114/286; 114/287; 200/228
[58] Field of Search .............................. 114/284–287, 114/271; 440/1; 364/429.01; 200/219, 153 A, 226–229, DIG. 29, 52 A, 52 R, 61.52, 220

[56] References Cited

U.S. PATENT DOCUMENTS

| | | | |
|---|---|---|---|
| 1,827,072 | 10/1931 | Cramblet | 200/228 |
| 3,695,204 | 10/1972 | Bennett | 114/286 |
| 3,876,850 | 4/1975 | Amberny | 200/220 |
| 4,232,626 | 11/1980 | Kern | 114/285 |
| 4,261,278 | 4/1981 | Gaudin | 114/286 |
| 4,420,741 | 12/1983 | West | 114/285 |
| 4,644,893 | 2/1987 | Zepp | 114/286 |
| 4,742,794 | 5/1988 | Hagstrom | 114/286 |
| 4,795,868 | 1/1989 | Benjamin | 200/220 |

FOREIGN PATENT DOCUMENTS 63-20290  1/1988  Japan ................................. 114/285

Primary Examiner—Joseph F. Peters, Jr.
Assistant Examiner—Clifford T. Bartz
Attorney, Agent, or Firm—O'Keefe & Wilkinson

[57] ABSTRACT

An apparatus for influencing the position of a boat in water, with trim flaps disposed on either side of the longitudinal axis of the boat, the flap angles of said trim flaps always being adjustable by a drive with a control device, which acts upon all the flap drives in dependence on a central control switch, which comprises several control contacts assigned to the tilting directions of the boat.

In order to control the position of the boat in the water automatically, the apparatus is designed so that the control switch comprises at least one movable, gravity-dependent contact-making body, which automatically activates the control device via the control contacts when the boat tilts.

9 Claims, 3 Drawing Sheets

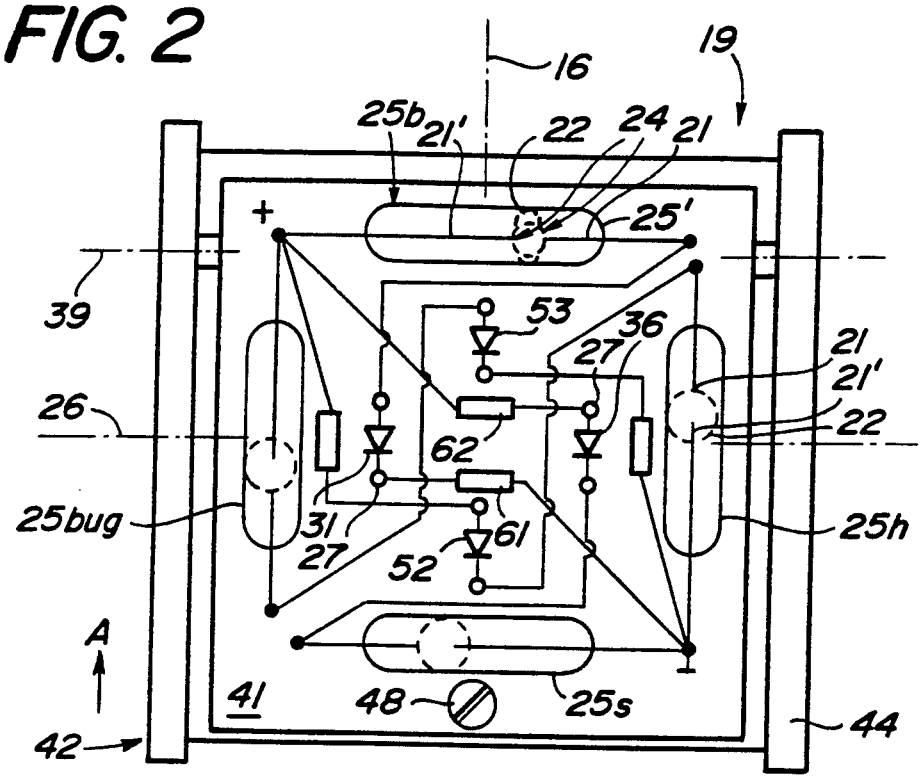
FIG. 2
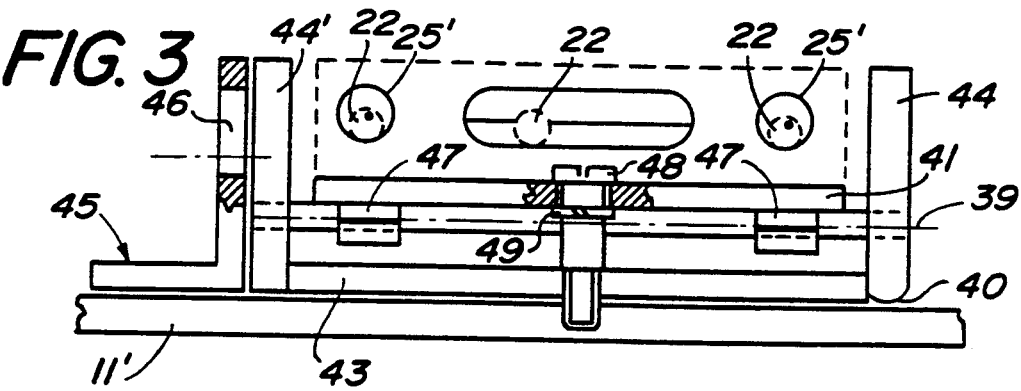
FIG. 3
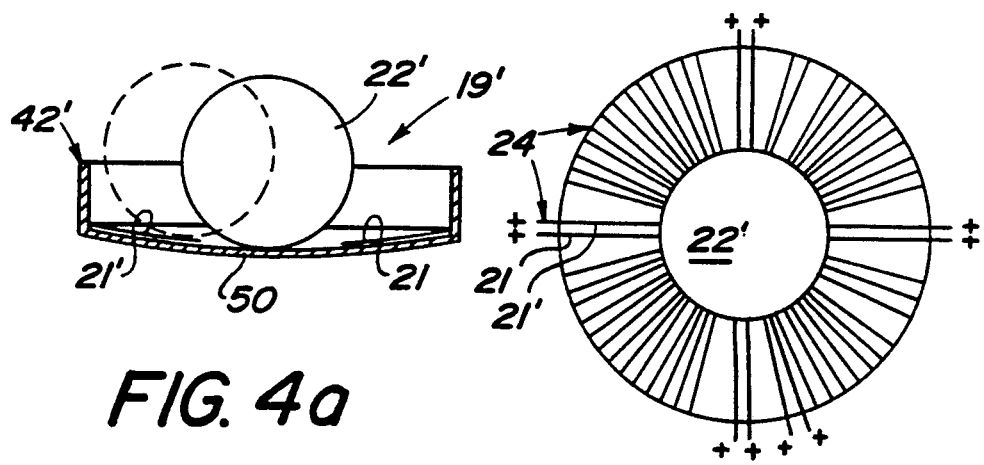
FIG. 4a
FIG. 4b

APPARATUS FOR INFLUENCING THE POSITION OF A BOAT IN WATER

The invention relates to an apparatus for influencing the position of a boat in water, with trim flaps disposed on either side of the boat's longitudinal axis. The flap angle of these trim flaps can always be set by a drive with a control device, which acts upon all the flap drives in dependence on a central control switch, which has several control contacts assigned with the tilt directions of the boat.

Such an apparatus is known from the German Offenlegungsschrift 2,743,154. The central control switch of this known apparatus has a center contact, which is movable manually and which, to control the tilt position of the boat, can selectively act upon the control contacts that are assigned to the tilt directions of the boat.

In contrast to this, it is an object of the invention to improve an apparatus of the type mentioned in the introduction, so that the position of the boat in the water can be controlled automatically.

This object is accomplished owing to the fact that the control switch has at least one contact-making, body which moves under the action of gravity and, when the boat tilts, automatically activates the control device via the control contacts.

It is important for the invention that a tilt of the boat directly activates the control device, namely in that the movable contact-making body acts upon the relevant control contacts through the force of gravity that comes into effect as a consequence of the boat's tilt. Manual intervention or a corresponding action by the pilot on the control device can be omitted, so that the pilot can concentrate entirely on piloting the boat.

The contact-making body of the control switch is mounted advantageously on a horizontally disposed floor of a housing in such a fashion that it can roll freely. This housing has at least one pair of contacts within the rolling range of the body. The ability of the contact-making body to roll freely enables it to produce a signal in reaction to the slightest tilt of the boat, a tilting torque not being necessary to activate the switch. As a consequence, a high response sensitivity of the control device is guaranteed.

The contact-making body is an electrically conducting body, which influences the control device by shunting or enabling a control contact pair. With this design also, no tilting torque or activating force is required to generate a signal. This would only be required if the contact-making body were not electrically conducting and consequently, for example, would have to deform a flexible contact in order to generate the desired control signal, which can be appropriately evaluated by the control device.

In a development of the invention, the control switch is equipped with at least one control contact pair and one mercury switch having a contact-making body. The deformation resistance or motional resistance of mercury is very low, so that the mercury switch can be used even with very slight tilts. The mercury switch is advantageously disposed as a break contact, the contact-making body of which opens at a tilt of about one angular degree.

Mercury switches as control switches or as components of a control switch are simple and inexpensive components, which function reliably and durably. So that they can be used to modulate all possible tilting directions in the horizontal plane, the apparatus is designed so that two mercury switches are assigned to the longitudinal and two to the transverse tilting axis of the boat. One of these mercury switches always responds when the boat tilts in one of the two directions of a boat tilting axis.

A simple circuit in which uses two mercury switches relate to a single boat tilting axis, is characterized in that the two mercury switches of a boat tilting axis are each connected with one of their two contacts and with the other to a connecting terminal of a voltage divider, the tap of which is connected to a comparator circuit. The comparator circuit generates control signals which are applied to the drives. This circuit in particular utilizes a single potential, namely a voltage of, for example, 12 volts which is available on board, to generate two different potentials, which can be utilized by the subsequent elements of the control device.

Each mercury switch is connected in series with a light-emitting diode, so that the switching state of all the mercury switches can always be visualized. This is important for the pilot, who therefore can always recognize easily whether the boat is aligned horizontally or is in the tilted position that is to be guaranteed by the control device. Furthermore, the light-emitting diodes can be used for the accurate installation of the mercury switches. Indeed, it is merely necessary, starting with a break position associated with a considerable tilt, to allow a mercury switch to approach the horizontal plane or a plane determined by the horizontally aligned printed circuit board, until the light-emitting diode just lights up. In this position, the associated mercury switch is closed and opens with only a small tilt of the printed circuit board or of the boat, which can be recognized by the extinction of the light-emitting diode.

A low-pass filter is connected between the voltage divider and the comparator circuit. This low-pass filter, for example, allows only signals lasting more than two seconds to pass, so that brief signals are suppressed. Such brief signals can be generated, for example, due to wave motions.

The comparator circuit has two comparators, one of which always generates a control signal, as a function of the potential prevailing at the tap of the voltage divider. By means of these voltage-dependent comparators or of the control signals generated by them, it is possible to act upon the drive motors for the trim flaps advantageously in such a fashion, that each comparator is connected both to a drive motor for port flaps and to a drive motor for starboard flaps in the sense of a contrary flap displacement. In this way, the port and starboard trim flaps are acted upon simultaneously in the sense of an optimal trim effect, the alignment always taking place relative to a single tilt axis.

However, it should also be possible to trim the boat relative to two mutually perpendicular tilt axes of one reference plane. For this purpose, the apparatus is designed so that the comparators are connected to the drive motors for the port and starboard flaps, when the boat tilts about both tilting axes, in the sense of compensating the tilt, only through the trim flap which is diagonally opposite the low position of the boat.

A simple structural design of the control switch arises owing to the fact that the floor of the housing is spherically concave and has at least eight strip-shaped contact pairs, which radiate from the edge in the direction of the center of the concavity and that are uniformly distributed about the circumference, or the housing permits only back and forth motions of the contact-making body and has two mutually opposite contact pairs, such a control switch of a tilt axis of the boat interacting with another similar control switch for the other tilt axis of the boat.

When the central control switch can be aligned horizontally about two mutually perpendicular axes, the installation position of the control device can be corrected or it is possible to prescribe for the boat a theoretical position, which deviates from the horizontal.

The invention is elucidated by way of an embodiment shown in the drawings.

FIG. 2 shows a top view of a schematically represented control switch.

FIG. 3 shows a front view of the control switch in FIG. 2, in the direction A.

FIGS. 4a, b schematically show another control switch with a single contact-making body.

Figures 5, 6:
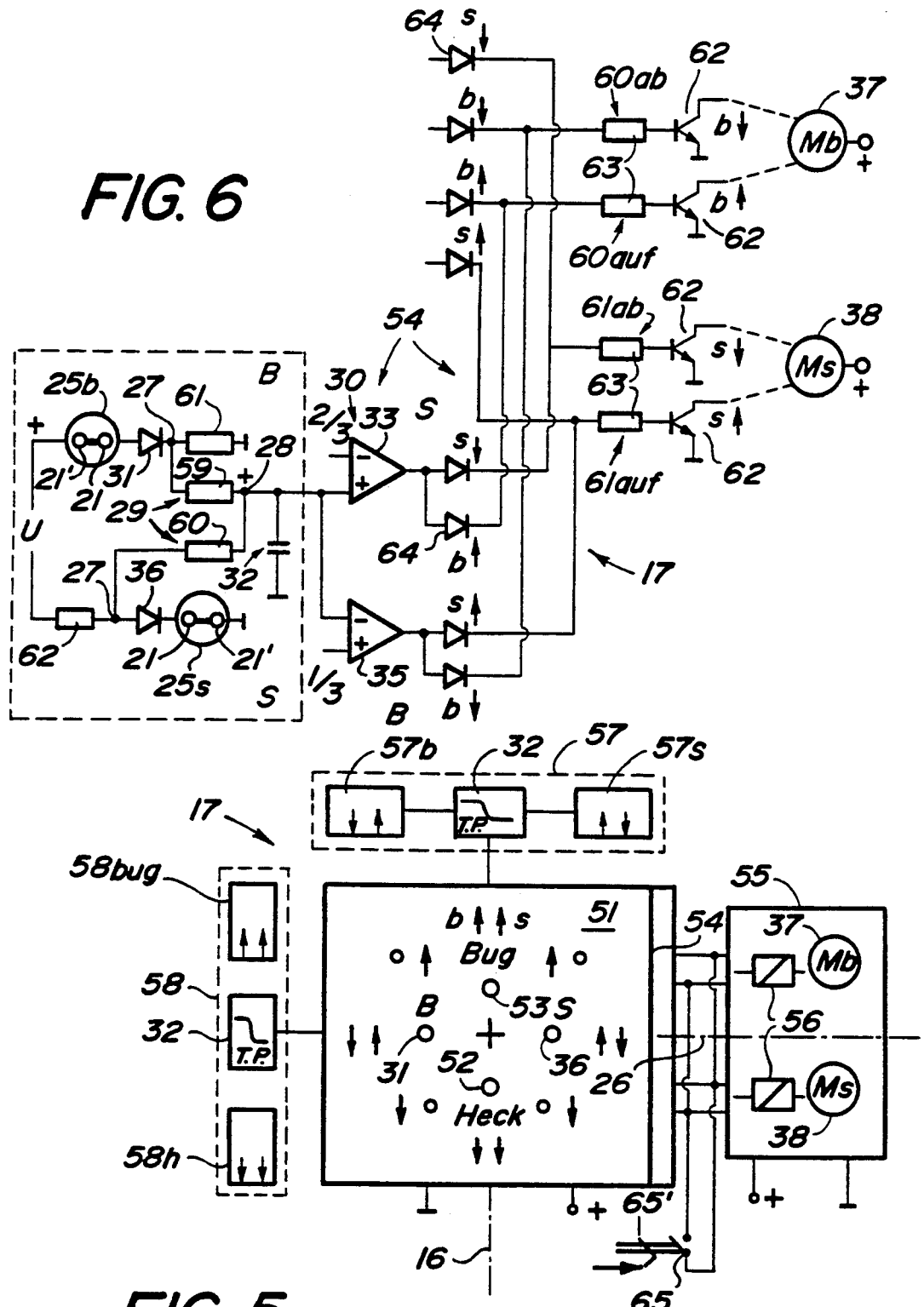

FIG. 5 shows a block circuit diagram of an inventive control device.

FIG. 6 shows a circuit of an inventive control device.

Figure 1:
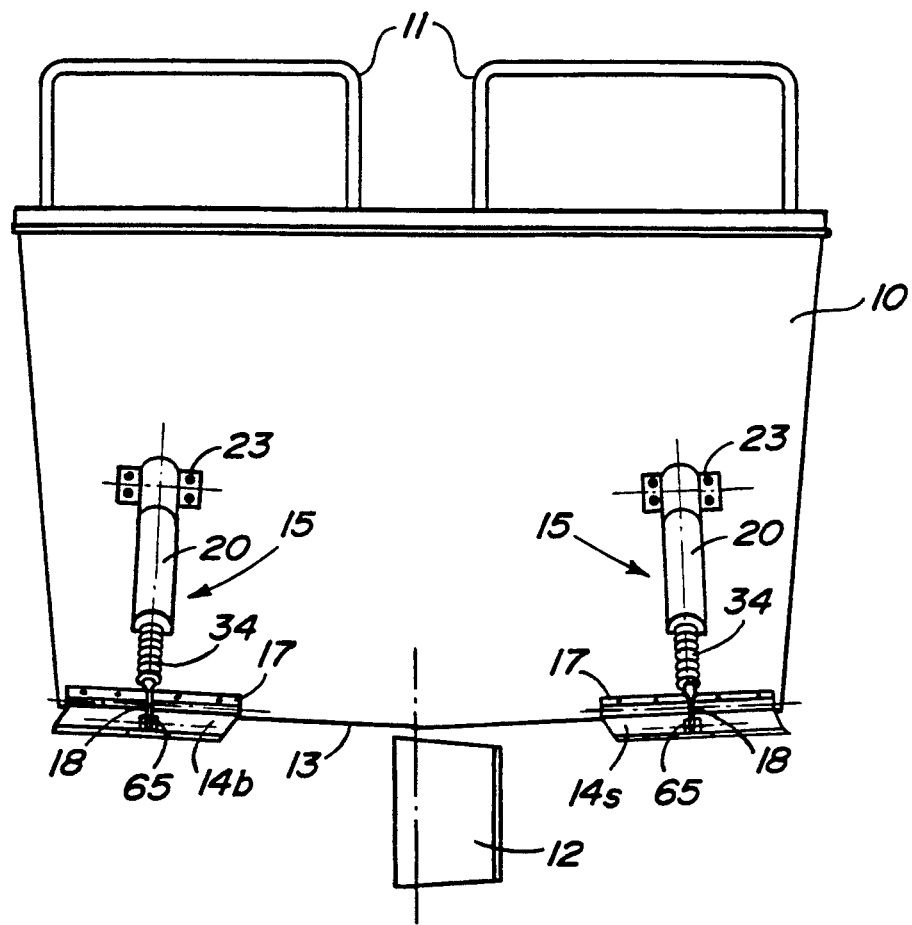
FIG. 1 shows a rear view of a boat with two trim flaps.

FIG. 1 shows the stern 10 of a boat with boat superstructures 11. The rudder 12 is also shown schematically. To the right and left of the rudder 12, trim flaps are disposed at the lower edge 13 of the boat hull, and specifically a trim flap 14b on the port side and one 14s on the starboard side. The two trim flaps are flipped downwards, to greater or lesser extent, by means of an apparatus 15. For this purpose, the trim flaps 14 b, s are hinged at bearing plates 17 in a manner that is not shown. The bearing plates 17, on their part, are fastened to the stern, for example, by screws. The trim flaps 14 b, s each have a hinged joint 65 at their edges, which lie opposite the bearing plates 17. Each of these hinged joints 65 engages a positioning rod 18 of the apparatus 15 so that it is possible for the trim flaps 14 b, s to swing or flip vertically upwards and downwards in order to influence appropriately the position of the boat in the water.

The positioning rod 18 is sealed into and guided in a drive 20. The sealing is accomplished by a bellows 34, which is clamped water-tight on the one hand to the positioning rod 18 and, on the other, to a housing of the drive 20. The drive 20, on its part, is fastened with a hinge and a fastening plate 23, which are not shown in more detail in FIG. 1, to the stern of the boat 10.

The control apparatus 19, shown schematically in FIGS. 2 and 3, essentially comprises a base plate 41, for example, a soldering Printed circuit board with a grid of holes, on which the circuit components are disposed. The base plate 41 has a housing 42, which comprises a floor plate 43, two side walls 44, 44', and a cover that is not shown. By means of the floor plate 43, the housing 42 and the control switch 19 respectively are fastened, for example by screwing, to a part 11' of the boat superstructure 11.

FIG. 3 shows an adjustable screw connection with a fastening angle 45, one of the legs of which is fastened to the part 11' while the other is fastened to a side wall 44'. It has a longitudinal slot 46, so that the (not shown) adjusting screw or the side wall 44' can be adjusted in height or with respect to its distance from the part 11'. The housing 42 is thus tilted about an axis 40 at the lower edge of the side wall 44.

So that the base plate 41 can also be moved to a limited extent about an axis that is perpendicular to the axis 40, it is clamped to a swiveling axis 39 by two clamps 47 that are fastened by screw connections. The two ends of the swiveling axis 39 are mounted in the side walls 44, 44'. An adjusting screw 48 is used to adjust the base plate 41. The head of the adjusting screw 48 is disposed in the base plate 41 so that it can rotate but cannot move axially. This is accomplished by means of a spring washer or a seeger circlip ring 49. The other end of the adjusting screw 48 engages the floor plate 43 so that it can be moved by screwing. By moving the adjusting screw 48, the edge region of the base plate 41 assigned to it is raised more or less relative to the swiveling axis 39. As a result, the base plate 41 can correspondingly be pivoted to a limited extent.

The base plate 41 can be adjusted about the two mutually perpendicular axes 39, 40 in order to align the control switch 19 relative to horizontal or relative to an arbitrary desired tilt position of the boat 10.

Its tilt axes pass through the center of gravity of the boat and are mutually perpendicular. They are symbolized in FIG. 2 by the axes 16, 26, so as to identify the dispositive assignment of the control switch 19 with these boat tilting axes.

The control switch 19 generates the theoretical values for that boat position to which the base plate 41 was aligned, that is, for example, the horizontal or another tilt position, which is determined by the structure of the boat and taken into account by virtue of the fact that the base plate 41 is appropriately pivoted to the required extent about its two mutually perpendicular adjustment axes 39, 40.

The control switch 19, shown in FIGS. 2, 3, has four mercury switches 25b through 25s. Each mercury switch comprises a cylindrical glass body 25', which is sealed air-tight and in which are disposed two control contacts 21, 21' lying in line opposite one another and which contains a movable contact-making body 22 that is a mercury sphere. This contact-making body can roll freely in the glass body 25'. When the mercury switch 25 tilts appropriately, the contact-making body can move so that the contact 21 is enabled. The control switch 19 comprises four mercury switches 25b, 25s, 25bug, 25h. All of these are disposed in the plane or parallel to the plane of the base plate 41, so that the contact-making body 22 just links together the control contacts 21, 21'. This connection is completely adequate to conduct the small currents for control purposes, without causing contact difficulties. In this arrangement and alignment, the mercury switches are used as break switches. For example, if the upper mercury switch 25b in FIG. 2 is disposed parallel to the base plate, and if the boat 10 tilts towards port or towards the left, the contact-making body 22 accordingly rolls to the left. As a result, the shorter right control contact 21' becomes free, and the circuit is thereby interrupted. When the boat tilts towards the right or towards starboard, the contact-making body 22, on the other hand, does not roll far enough to the right to enable the longer control contact 21, so that the mercury switch 25b remains closed. On the other hand, the switch 25s opens.

Together with its anti-parallel lower mercury switch 25s, the mercury switch 25b is assigned to the transverse tilt axis 16 of the boat 10. The mutually anti-parallel mercury switches 25 b, s therefore respond alternately when the boat 10 tilts towards port or towards starboard. Furthermore, two mercury switches 25bug and 25*h* are disposed on the base plate 41, perpendicularly to the aforementioned mercury switches 25 *b*, *s*. The mercury switches 25*bug* and 25*h* are assigned to the longitudinal tilt axis 26. Accordingly, the switch 25*bug* responds when the bow of the boat tilts forwards, for example, due to overload, and the mercury switch 25*h* responds when the stern lies too low in the water.

FIGS. 4*a*, *b* show a control switch 19′ with a single contact-making body 22′, which is designed as a metal sphere. The housing 42′ of the control switch 19′ has a spherically concave floor 50, on which the contact-making body 22′ can roll freely. It is oriented in the respective tilt direction by the action of gravity. The floor 50 has contact pairs 24, radiating from the edge to the center of the concavity. According to FIG. 4*b*, they are uniformly distributed about the circumference. The contacts 21 of each contact pair 24 are connected to a positive potential, while the contacts 21′ are grounded or are connected to the control device. If the housing 42 tilts, for example, towards port, the contact-making body 22′ rolls to the contacts labeled 21, 21′ in FIGS. 4 *a*, *b*. As a result, the control device receives a signal, which causes the trim flaps to be activated. In FIG. 4*b*, further contact pairs are provided between the contact pairs which run in the directions of the tilt axes, in order to compensate slant positions between the above-mentioned coordinate axes. A plurality of contact pairs is disposed over the sector that can be seen in FIG. 4*b* in order to detect in the range of bow/starboard tilting those with a stronger bow tilt just as well as those with a stronger starboard tilt. The expense of manufacturing such a switch is small, because the floor 50 can be manufactured with a conventional etching technique, by means of which the control contacts of the floor 50 are etched out from a metal coating applied to the floor. The control switch 19′ therefore can be manufactured inexpensively, and the evaluation of signals generated in this fashion presents no difficulties.

It is understood that, instead of the control switch 19′ shown, a control switch can also be used, which comprises, as a track for the contact-making body 22′, only one arcuately concave strip which centrally encloses the lowest position and has two contact pairs 24 lying opposite to one another. If two such switches are used, they can each be assigned to one tilt axis each and the signals generated by them are used by the control device to activate appropriately wired drives for the trim flaps 14*s* and 14*b* in such a fashion that the tilt can be compensated for while the boat is running.

FIG. 5 shows a block circuit diagram of the functional diagram of the control device 17 with respect to the boat tilting axes 16, 26. The light-emitting diodes 31 for the starboard load, 36 for the port load, 52 for the stern load, and 53 for the bow load are shown in the block 51. They are also correspondingly labeled and disposed as components in FIG. 2. In a circle surrounding the diodes, the arrows indicate the trim flap motions, which must be brought about by the drive motors 37, 38 for port and for starboard. For example, a tilt in the running direction means that both the port side, as well as the starboard side trim flaps 14 *b*, *s* must be moved upwards to compensate for the low position of the bow of the boat 10. Accordingly, both trim flaps 14 *b*, *s* must be moved downwards to compensate for a low position of the stern. For a port load B, it turns out that the port side trim flap 14*b* must be lowered and the starboard side trim flap 14*s* must be raised. In the case of slant positions, one of the trim flaps will not be activated at all. For example, if a bow load and a starboard load exist simultaneously, the port side trim flap 14*b* is not activated, while the starboard side trim flap 14*s* must be raised. The corresponding situation applies equally to other slant positions.

Block 51 is supplied with voltage just like block 55, for example with the on-board voltage of 12 volts. All the circuits of the drive motors 37, 38 are accommodated in block 55. These circuits are well-known and consequently, for the sake of simplicity, not shown. These circuit parts are only symbolized by the relays 56, which switch the control current. The relays are acted upon by a logic and driver circuit 54 of the block 51, which, in turn, is acted upon by a signal circuit 57 of the boat tilting axis 16 and on the other hand by a signal circuit 58 of the boat tilting axis 26.

The signal circuit 57 has a circuit block 57*b* for a port load and a circuit block 57*s* for a starboard load. The two circuits are linked together through a low-pass filter 59. This means that their signals are filtered, so that the block 51 or the logic and driver circuit 54 is acted upon only when the sensed signal is present for a certain time. Accordingly, the signal circuit 58 has a block 58*bug* for a bow load and circuit block 58*h* for a stern load. These two blocks also are linked together through a low-pass filter 59, which has the effect described above.

FIG. 6 shows the circuit elements of the blocks described above or the signal circuits 57, 58 and of the logic/driver circuit 54. The signal block 57 for the transverse tilting axis 16 has the mercury switches 25*b* and 25*s*. These are both symbolized as break contacts. The control contact 21′ of the switch 25*b* is connected to a plus potential, and the control contact 21′ of the switch 25*s* is connected to ground. The control contacts 21 of the two switches 25 *b*, *s* are connected via the diodes 31, 36 assigned to them to the terminals 27 of a voltage divider 29. The latter consists of resistors 59, 60, which are connected in series, are of the same magnitude and have a tap 28 between them. Furthermore, the terminals 27 are grounded through the resistors 61, 62. The low-pass filter 32 is connected to the tap 28 and can be designed, for example, as a capacitor. It needs to be charged only when the signal circuit 57 can deliver a sufficiently large signal to the comparator circuit 30, which is likewise connected at the tap 28.

The comparator circuit 30 has two comparators 33, 35, the positive and negative inputs of which lie at the tap 28. The negative input of comparator 33 lies at $\frac{2}{3}$ U and the positive input of the comparator 35 lies at $\frac{1}{3}$ U of the terminal voltage of the signal circuit 57. Accordingly, the comparator 33 emits a signal when the voltage of the tap 28 is greater than $\frac{2}{3}$ U, and the comparator 35 emits a signal when the voltage of its minus input is less than $\frac{1}{3}$ U. The comparator 33 becomes active with a starboard load S, while the comparator 35 becomes active with a port load B.

The potential at the tap 28 is determined by the resistors 59, 60 of the voltage divider 29, and amounts to U/2 when both switches 25*b*, 25*s* are closed. If switch 25*b* is opened due to a port load B, the positive potential at the tap 28 falls away, and the voltage at the negative input of the comparator 35 is practically zero. As a consequence, with appropriate (not shown) circuitry, the comparator 35 emits a signal to the driver circuit 54. On the other hand, if the mercury switch 25*s* is open due to a starboard load S, the tap 28 practically has the potential U and, with appropriate (not shown) circuitry, the comparator 33 emits a signal.

Accordingly, the control switch circuit 58 is suitably constructed and generates a potential, by the magnitude of which an appropriate (not shown) comparator circuit emits control signals, when there is a stern load or a bow load.

Aside from the comparator circuits 30 for the two tilt axes 16, 26, the logic/driver circuit 54 has driver branches 60*ab*, 60*auf* for the drive motor 37 of the port flaps 14*b*, as well as driver branches 61*ab*, 61*auf* for the drive motor 38 of the starboard flaps 14*s*. Each driver branch essentially has one switching transistor 62, by means of which the drive motors 37, 38 are appropriately activated, that is, in such a fashion that the drive motor 37, 38 moves in one or the other rotational direction, in order to move the trim flaps 14 *b, s* up or down in the desired direction. The transistors 62 are fed over resistors 63, to which are connected the outputs of the comparators 33, 35 in each case over the diodes 64. The connection is made in the sense of the direction of motion of the flaps 14 *b, s*, shown in FIG. 5, the direction of motion always being shown at the diodes 64 and at the transistors 62.

If the signal circuit 58 detects, for example, a bow load, the driver branches 60*auf* and 61*auf* are acted upon by appropriate voltage signals from the comparator of the signal circuit 58 assigned to them. If the signal circuit 57 detects a port load, the comparator 35 emits a signal, which is conducted to the driver branch 60*ab* and the driver branch 61*auf*, so that the drive motor 37 acts on the trim flap 14*b* in the sense of lowering this trim flap in order to compensate for the slant position, while the motor 38 moves the trim flap 14*s* upwards, so that the boat is pressed downward on the starboard side through the against the upwardly positioned trim flap 14*s*, which helps to compensate for the port slant position. A bow/port slant position is compensated by determining both the bow load and the port load, so that the signals generated on the driver branches 60*ab*, 60*auf* compensate. The motor 37 thus remains idle, while the other two signals are applied in the same sense to the driver branch 61*auf*, so that the motor 38 moves the trim flap 14*s* upwards, as required. The circuit is accordingly also constructed for all other conceivable slant positions relative to the boat tilting axes 16, 26.

The signal circuit 57 is shown in FIG. 2 in its spatial arrangement, relative to some of its essential components. The mercury switches 25*b*, 25*s* lie at the plus pole or respectively at ground. They are wired to their associated diodes 31, 36 so that the latter, when they light up, allow a corresponding port load B or starboard load S to be recognized by their corresponding port side and respectively starboard side arrangement. Also shown is the wiring of the terminals 27 of the voltage divider 29 to ground via the resistors 61, 62. The voltage divider 29 itself has been omitted to simplify the drawing. The wiring of the corresponding components for the signal circuit 58 is likewise drawn.

FIG. 5 shows yet another switch 65, which is used to switch on drive motors 37, 38 directly for the port and starboard flaps 14*b*, 14*s*. The drive motors are switched on and off by this switch 65, in the sense of a synchronous flap displacement or longitudinal trimming. The switching time depends on the boat speed, which is measured, for example, with a pitot tube or with a boat tachometer. It is also possible to activate the switch 65 by a gas pull. However, in this case, a delay element must be provided since more gas sometimes must be given during starting. The delay time amounts, for example, to two seconds. In FIG. 5, the arrow identifies the activation direction and the arrow tip 65' identifies the required delay element.

I claim:

1. An apparatus for influencing the position of a boat in water, by the use of trim flaps disposed on either side of the longitudinal axis of the boat, such that the flap angles of said trim flaps can be adjusted by a drive associated with a control device, which control device acts upon the flap drive in accordance with a control switch, which switch has several control contacts assigned to the tilting directions of the boat, wherein the control switch is comprised of a plurality of movable contact-making bodies activated by gravity and which, when the boat is tilted, automatically activate the control device through associated control contacts, said contact bodies and control contacts comprising mercury switches having a control contact pair and a mercury contact-making body which will make or break contact between the control contacts with a tilt of about one angular degree from horizontal and wherein two separate mercury switches are assigned to each of the longitudinal tilt axis and the transverse tilt axis of the boat and have a construction such that one of each two separate pairs responds by establishing electrical contact between its associated control contacts when the boat tilts along one or more of its longitudinal tilt axis and transverse tilt axis and wherein each of the two mercury switches assigned to the boat tilting axes are connected by one of their two contacts to a dc pole and by the other contact to a terminal of a voltage divider, the tap of which is connected to a comparator circuit, which generates control signals to be applied to the drives.

2. The apparatus of 1 wherein a low-pass filter is connected between the voltage divider and the comparator circuit.

3. The apparatus of claim 1 wherein the comparator circuit comprises two comparators, one of which generates a control signal as a function of the potential existing at the tap of the voltage divider.

4. The apparatus of claim 3 wherein each comparator is connected both to a drive motor for one set of flaps as well as to a drive motor for an opposite set of flaps on the boat in the sense of a contrary flap displacement.

5. The apparatus of claim 3 wherein the comparators are connected to the drive motors for both sets of flaps and in the event of a slant position of the boat about both tilt axes the trim flap diagonally opposite the portion of the boat which is slanted downwardly is adjusted to compensate for such slant.

6. An apparatus for influencing the position of a boat in water, by the use of trim flaps disposed on either side of the longitudinal axis of the boat, such that the flap angles of said trim flaps can be adjusted by a drive associated with a control device, which control device acts upon the flap drive in accordance with a control switch, which switch has several control contacts assigned to the tilting directions of the boat, wherein the control switch is comprised of a plurality of movable contact-making bodies which are activated by gravity and which, when the boat is tilted, automatically activate the control device through associated control contacts, said contact bodies and control contacts comprising mercury switches having a control contact pair and a mercury contact-making body which will make or break contact between the control contacts with a tilt of about one angular degree from horizontal and wherein each of the mercury switches is respectively connected in series with a light-emitting diode.

7. An apparatus for influencing the position of a boat in water, with trim flaps disposed on either side of the longitudinal axis of the boat, such that the flap angles of each of said trim flaps can be adjusted by a drive with a control device, which acts upon all the flap drives in dependence on a central control switch, which has at least one movable contact-making body, which depends on gravity and which, when the boat is tilted, automatically activates the control device through the control contacts assigned to the transverse and to the longitudinal directions of the boat, characterized in that the control switch uses as a contact-making body, mercury in a mercury switch having a cylindrical housing with a control contact pair, that there are assigned to each of the longitudinal axis of the boat and to the transverse axis of the boat two mercury switches, one of which responds in each case when the boat tilts in one of the two tilting directions of the boat tilting axes and that the two mercury switches assigned to the boat tilting axis are connected through one of their two contacts to a dc pole and with the other contact to a terminal of a voltage divider the tap of which is connected to a comparator circuit which generates control signals to be applied to the drive for the trim flaps.

8. A control apparatus to control movement of flap operating means on a boat for influencing the trim of the boat during forward movement, said boat having a longitudinal axis of tilt and a transverse axis of tilt, comprising:
   (a) a base mounted upon said boat,
   (b) a series of mercury switches mounted upon said base in a position such that said switches are normally disposed substantially horizontally when the boat is at rest,
   (c) each mercury switch comprising a separate elongated enclosure having a configuration defining an enclosed substantially linearly extended track along the extended length of which the mercury may move under the influence of gravitation as the switch is moved in various orientations, the mercury being confined from substantial movement transverse of said extended track by its enclosure,
   (d) each mercury switch being provided with two opposed contacts which are bridged by the mercury to establish electrical conductance between the contacts when the extended track of the switch is tilted in one direction about an axis transverse to its extended length, but not when it is tilted in the opposite direction about said transverse axis or when horizontally disposed,
   (e) said elongated mercury switches being oriented with their extended lengths generally parallel to the longitudinal and transverse axes of the boat to provide an indication of tilting along said axes, there being at least two sets of contacts disposed parallel to each of said axes to provide separate indications of tilting in either of two directions along said axis, and
   (f) electrical discrimination means to process the signals from the mercury switches to determine the tilt of the base and from this the trim of the boat and to operate the trim flap means to adjust the trim of the boat.

9. A control apparatus in accordance with claim 8 wherein there are two separate elongated mercury switches positioned parallel to each axis of the boat, each switch being provided with only two contacts for indication of tilt along the axis in one direction.

* * * * *